United States Patent
Brockhaus et al.

(10) Patent No.: US 10,215,607 B2
(45) Date of Patent: Feb. 26, 2019

(54) METHOD FOR OPERATING A FLOWMETER AND RESPECTIVE FLOWMETER

(71) Applicant: KROHNE Messtechnik GmbH, Duisburg (DE)

(72) Inventors: Helmut Brockhaus, Oberhausen (DE); Markus Dabrowski, Duisburg (DE); Wilhelm Florin, Duisburg (DE)

(73) Assignee: KROHNE Messtechnik GmbH, Duisburg (DE)

(*) Notice: Subject to any disclaimer, the term of this patent is extended or adjusted under 35 U.S.C. 154(b) by 85 days.

(21) Appl. No.: 15/150,854

(22) Filed: May 10, 2016

(65) Prior Publication Data

US 2016/0334257 A1    Nov. 17, 2016

(30) Foreign Application Priority Data

May 11, 2015 (DE) .......................... 10 2015 107 366

(51) Int. Cl.
*G01F 15/00* (2006.01)
*G01F 25/00* (2006.01)
(Continued)

(52) U.S. Cl.
CPC .............. *G01F 15/001* (2013.01); *G01F 1/72* (2013.01); *G01F 15/07* (2013.01);
(Continued)

(58) Field of Classification Search
CPC ................ B01D 35/04; E03C 2201/40; G01N 2035/1025; Y10T 137/9464; Y10T 436/2575
See application file for complete search history.

(56) References Cited

U.S. PATENT DOCUMENTS 5,589,057 A * 12/1996 Trimble ................... B01J 8/003
 208/148
5,753,512 A * 5/1998 Riall ...................... G01N 35/04
 422/549

(Continued)

*Primary Examiner* — Elias Desta
(74) *Attorney, Agent, or Firm* — Borden Ladner Gervais LLP

(57) ABSTRACT

Described and shown is a method for operating a flowmeter (1) having a measuring tube (2), wherein the flow (d) of a medium (4) through the measuring tube (2) is measured. A continuous dwell time of the measured flow (d) greater than or equal to a flow threshold ($d_s$) is assigned to a flow interval ($\Delta t_{D,1}$, $\Delta t_{D,2}$) and a flow volume ($V_1$, $V_2$) is determined from the measured flow (d) in the flow interval ($\Delta t_{D,1}$, $\Delta t_{D,2}$). In each case, a continuous dwell time of the measured flow (d) less than the flow threshold ($d_s$) is assigned to a zero flow interval ($\Delta t_{N,1}$). In each case, a deviation volume of the flow volume ($V_1$, $V_2$) in one of the flow intervals ($\Delta t_{D,1}$, $\Delta t_{D,2}$) from a reference flow volume is determined and the deviation volume is compared to a threshold deviation volume. If the deviation volume in one of the flow intervals ($\Delta t_{D,1}$, $\Delta t_{D,2}$) is less than the threshold deviation volume, a zero flow through the measuring tube (2) is determined and compensated using the measured flow (d) in the zero flow interval ($\Delta t_{N,1}$) directly preceding the flow interval ($\Delta t_{D,1}$, $\Delta t_{D,2}$).

20 Claims, 2 Drawing Sheets

(51) Int. Cl.
*G01F 1/72* (2006.01)
*G01F 15/07* (2006.01)
*G01F 1/58* (2006.01)
*G01F 1/00* (2006.01)
*G01F 11/00* (2006.01)
*G01F 13/00* (2006.01)
*G01F 15/075* (2006.01)
*G01F 22/00* (2006.01)

(52) U.S. Cl.
CPC ............ *G01F 25/0092* (2013.01); *G01F 1/00* (2013.01); *G01F 1/58* (2013.01); *G01F 11/00* (2013.01); *G01F 13/00* (2013.01); *G01F 15/005* (2013.01); *G01F 15/0755* (2013.01); *G01F 22/00* (2013.01); *G01F 25/0084* (2013.01)

(56) References Cited

U.S. PATENT DOCUMENTS

| | | | |
|---|---|---|---|
| 7,326,334 B2 * | 2/2008 | Boyd | B01D 35/04 210/419 |
| 2012/0211518 A1 | 8/2012 | Freidin | |

* cited by examiner

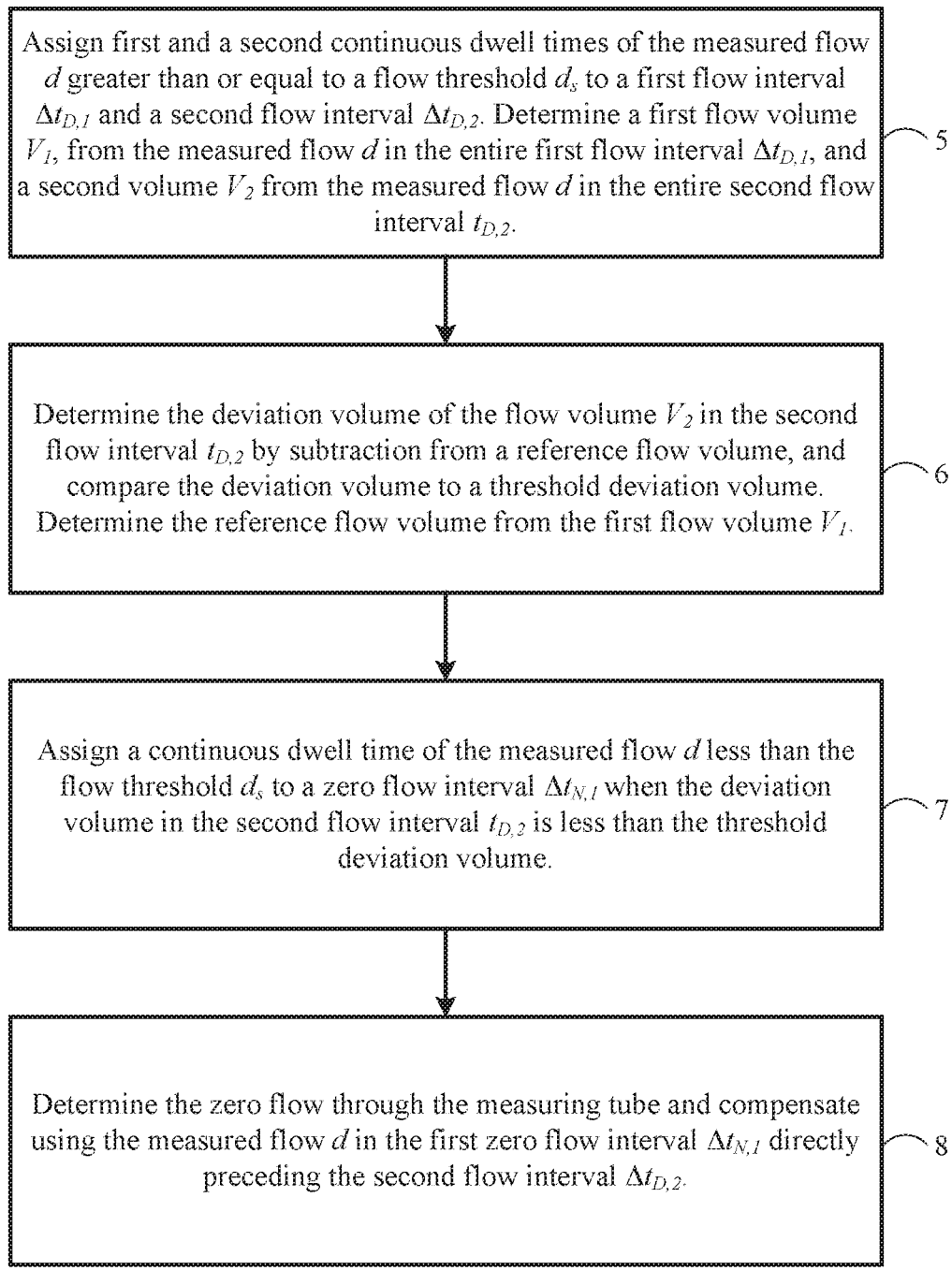
Fig. 3
Amended

METHOD FOR OPERATING A FLOWMETER AND RESPECTIVE FLOWMETER

CROSS-REFERENCE TO RELATED APPLICATIONS

The present application claims priority to the German patent application number 10 2015 107 366.8, filed on May 11, 2015, which are hereby incorporated by reference.

FIELD OF THE INVENTION

The invention relates to a method for operating a flowmeter having a measuring tube, wherein the flow of a medium through the measuring tube is measured. Furthermore, the invention relates to a flowmeter having a measuring tube and a controller, wherein, during operation, the controller measures the flow of a medium through the measuring tube.

BACKGROUND OF THE INVENTION

A flowmeter having a measuring tube implements a measuring principle for measuring the flow of a medium through the measuring tube and measures the flow according to the measuring principle during operation. The volume flow and the mass flow of the medium through the measuring tube are thereby designated as flow.

The measuring accuracy of a flowmeter is, in particular, determined using the zero flow through the measuring tube. The zero flow is the flow that is measured by the flowmeter when a medium is not flowing through the measuring tube. If the zero flow is not equal to zero, then the flow of the flowing medium measured by the flowmeter is afflicted with a constant error in the amount of the zero flow. Accordingly, a zero flow not equal to zero causes a constant measurement error.

Thus, the object of the invention is to provide a method for operating a flowmeter as well as a flowmeter, in which a measurement error caused by a zero flow not equal to zero is at least reduced.

According to a first teaching, the invention relates to a method for operating a flowmeter, in which the derived and shown object is achieved. The method according to the invention is initially and essentially characterized by the following method steps: In a first method step, in each case, a continuous dwell time of the measured flow greater than or equal to a flow threshold is assigned to a flow interval and a flow volume is determined from the measured flow in the flow interval. In a second method step, in each case, a continuous dwell time of the measured flow less than the flow threshold is assigned to a zero flow interval. In a third method step, in each case, a deviation volume of the flow volume in one of the flow intervals from a reference flow volume is determined and the deviation volume is compared to a threshold deviation volume. In a fourth method step, if the deviation volume in one of the flow intervals is less than the threshold deviation volume, a zero flow through the measuring tube is determined and compensated using the measured flow in the zero flow interval directly preceding the flow interval. The compensation of the zero flow is carried out, for example, by subtracting the zero flow from the measured flow, whereby the constant measurement error caused by the zero flow is at least reduced.

It can be seen from the first and second method steps that the method according to the invention requires a flow profile of the medium through the measuring tube, in which the measured flow of the medium is in flow intervals greater than or equal to the flow threshold and in zero flow intervals less than the flow threshold. In a first example, the flow profile of the medium in the measuring tube is generated by a calibration device. In a second example, the flow profile is given by the process, in which the flowmeter is integrated. The process is, for example, a filling process of a medium into a container. A filling process consists essentially of a first and a second filling step that is continuously repeated. In the first filling step, a container is filled with the medium in that the medium is conveyed, whereby it also flows through the measuring tube. In the second filling step, the filled container is replaced by a further container, wherein the medium is not conveyed and, thus, does not flow through the measuring tube. Consequently, the flow threshold is chosen so that the first method step of the method according to the invention is carried out during the first filling step of the filling process and the second method step is carried out during the second filling step. Therefore, the method according to the invention is particularly suitable for filling processes.

The fourth method step is based on the insight according to the invention, that the deviation volume of the flow volume in one of the flow intervals from the reference flow volume corresponds to a flow volume in the zero flow interval directly preceding the flow interval. Since a flow volume in a zero flow interval influences the determination of the zero flow, the zero flow is only determined using a flow measured in a zero flow interval when the deviation volume in the flow interval directly following the zero flow interval is less than the threshold deviation volume. Accordingly, the threshold deviation volume corresponds to the deviation of the zero flow from zero, which is why the threshold deviation volume is determined by the tolerable, constant measurement error caused in a process by the zero flow.

In the method according to the invention, the condition for determining the zero flow is that the deviation volume is less than the threshold deviation volume, which is why the method does not require a reference flow volume of a certain amount. Thus, it is provided in a first implementation of the method according to the invention that the reference flow volume is determined from at least one of the flow volumes. The implementation is, in particular, advantageous for filling processes since the filling steps and, thus, also the flow intervals and zero flow intervals are continuously repeated and, hence, a plurality of flow volumes is determined.

In a further development of the previous implementation, it is provided that the reference flow volume is determined in that one of the flow volumes is assigned to the reference flow volume. The assignment of one of the flow volumes to a reference flow volume represents the simplest form of determining the reference flow volume.

Every measurement of a physical quantity, as is carried out for measuring the flow of a medium, is affected by errors. The errors include, in any case, statistically distributed errors such as noise and can also include sporadic errors. The errors are also contained in the flow volumes determined from the flow, which is why they are contained in the reference flow volume in the assignment of one of the flow volumes to the reference flow volumes. Thus, in order to reduce errors in the reference flow volume, it is provided in an alternative further development of the previous implementation that the reference flow volume is determined in that the average value of at least two of the flow volumes is determined and assigned to the reference flow volume.

Each flow interval begins when the measured flow exceeds the flow threshold and ends when the measured flow falls below the flow threshold. Accordingly, each zero flow interval begins when the measured flow falls below the flow threshold and ends when the measured flow exceeds the flow threshold. So that the flow volume determined from the measured flow corresponds to the actual flow volume, the flow threshold is to be assigned to a flow of zero. However, since the measured flow is affected by errors, a flow greater than the errors is to be assigned to the flow threshold, wherein the flow assigned to the flow threshold is usually close to zero.

The flow through the measuring tube normally has a large gradient both when exceeding as well as when falling below the flow threshold, which results in a transient response of the flow. Thus, in order to increase the accuracy and/or constancy of the determination of the flow volume, it is provided in a further implementation of the method that the flow volume, in each case, is determined in a sub-interval of a flow interval. The duration of the sub-interval in one of the flow intervals is thereby measured so that the transient responses of the flow within the flow interval have already subsided. The smaller duration of a sub-interval compared to a flow interval has the effect that a certain flow is smaller than the actual flow, which, however, has no effect on the method according to the invention.

In order to the increase of the accuracy and/or constancy of the determination of the zero flow, respective considerations have led to a further implementation, in which it is provided that, in each case, the measured flow is used in a sub-interval of a zero flow interval. In this implementation, the duration of the sub-interval is also dimensioned so that transient responses of the flow within the sub-interval have already subsided.

The effort of the method according to the invention is reduced in a further implementation in that, in each case, a continuous dwell time of the measured flow less than the flow threshold is assigned to a zero flow interval, if the deviation volume in a flow interval is less than the threshold deviation volume, wherein the zero flow interval directly precedes the flow interval. Accordingly, not every continuous dwell time of the measured flow less than the flow threshold is assigned to a zero flow interval, rather a continuous dwell time of the measured flow less than the flow threshold is assigned to a zero flow interval only when the deviation volume in the following flow interval is less than the threshold deviation volume.

It is provided in a further implementation that the zero flow is determined using the measured flow in one, single zero flow interval. The accuracy of determination of the zero flow, however, is increased when the determination is carried out successively. Thus, it is provided in an implementation alternative to the previous implementation that the zero flow is determined using the measured flow from at least two zero flow intervals in that a moving average is formed from the measured flow in the at least two zero flow intervals or in that a median filter is used on the measured flow in the at least two zero flow intervals.

According to a second teaching, the invention relates to a flowmeter, in which the derived and depicted object is achieved. The flowmeter according to the invention is initially and essentially characterized in that, during operation, the controller stores a flow threshold, a reference flow volume, and a threshold deviation volume. Furthermore, during operation, the controller assigns, in each case, a continuous dwell time of the measured flow greater or equal to the flow threshold to a flow interval and determines a flow volume from the measured flow in the flow interval. It further assigns, in each case, a continuous dwell time of the measured flow less than the flow threshold to a zero flow interval. Furthermore, during operation, the controller determines, in each case, a deviation volume of the flow volume in one of the flow intervals from the reference flow volume and compares the deviation volume to the threshold deviation volume. If the deviation volume in one of the flow intervals is less than the threshold deviation volume, the controller determines and compensates the zero flow through the measuring tube using the measured flow in the zero flow interval directly preceding the flow interval.

The explanations in respect to the method according to the method also hold true for the flowmeter according to the invention.

A design of the flowmeter according to the invention provides that the controller carries out a previously described method according to the invention.

It is provided in a further design that the flowmeter is a magnetic-inductive flowmeter or a nuclear-magnetic flowmeter.

In detail, there is a plurality of possibilities for designing and further developing the method according to the invention and the flowmeter according to the invention.

In one aspect, the present invention provides a method for operating a flowmeter (1) having a measuring tube (2), wherein the flow (d) of a medium (4) through the measuring tube (2) is measured, characterized in that, in each case, a continuous dwell time of the measured flow (d) greater than or equal to a flow threshold ($d_s$) is assigned to a flow interval ($\Delta t_{D,1}$, $\Delta t_{D,2}$) and a flow volume ($V_1$, $V_2$) is determined from the measured flow (d) in the flow interval ($\Delta t_{D,1}$, $\Delta t_{D,2}$), that, in each case, a continuous dwell time of the measured flow (d) less than the flow threshold ($d_s$) is assigned to a zero flow interval ($\Delta t_{N,1}$), that, in each case, a deviation volume of the flow volume ($V_1$, $V_2$) in one of the flow intervals ($\Delta t_{D,1}$, $\Delta t_{D,2}$) from a reference flow volume is determined and the deviation volume is compared to a threshold deviation volume, and that, if the deviation volume in one of the flow intervals ($\Delta t_{D,1}$, $\Delta t_{D,2}$) is less than the threshold deviation volume, a zero flow through the measuring tube (2) is determined and compensated using the measured flow (d) in the zero flow interval ($\Delta t_{N,1}$) directly preceding the flow interval ($\Delta t_{D,1}$, $\Delta t_{D,2}$).

In one aspect, the reference flow volume is determined from at least one of the flow volumes ($V_1$, $V_2$).

In one aspect, the reference flow volume is determined in that one of the flow volumes ($V_1$, $V_2$) is assigned to the reference flow volume.

In one aspect, the reference flow volume is determined in that an average value of at least two of the flow volumes ($V_1$, $V_2$) is determined and assigned to the reference flow volume.

In one aspect, the flow volume ($V_1$, $V_2$), in each case, is determined in a sub-interval of a flow interval ($\Delta t_{D,1}$, $\Delta t_{D,2}$).

In one aspect, the measured flow (d), in each case, is used in a sub-interval ($\Delta t'_{N,1}$) of a zero flow interval ($\Delta t_{N,1}$).

In one aspect, in each case, if the deviation volume in one of the flow intervals ($\Delta t_{D,1}$, $\Delta t_{D,2}$) is less than the threshold deviation volume, a continuous dwell time of the measured volume (d) less than the flow threshold ($d_s$) is assigned to a zero flow interval ($\Delta t_{N,1}$), wherein the zero flow interval ($\Delta t_{N,1}$) directly precedes the flow interval ($\Delta t_{D,1}$, $\Delta t_{D,2}$).

In one aspect, the zero flow is determined using the measured flow (d) of at least two zero flow intervals ($\Delta t_{N,1}$), in that a moving average is formed from the measured flow (d) in the at least two zero flow intervals ($\Delta t_{N,1}$) or in that a median filter is used on the measured flow (d) in the at least two zero flow intervals ($\Delta t_{N,1}$).

In one aspect, the present invention provides a flowmeter (1) having a measuring tube (2) and a controller (3), wherein the controller (3) measures the flow (d) of a medium (4) through the measuring tube (2) during operation, characterized in that, during operation, the controller (3) stores a flow threshold ($d_s$), a reference flow volume and a threshold deviation volume, assigns, in each case, a continuous dwell time of the measured flow (d) greater or equal to the flow threshold ($d_s$) to a flow interval ($\Delta t_{D,1}$, $\Delta t_{D,2}$) and determines a flow volume ($V_1$, $V_2$) from the measured flow (d) in the flow interval ($\Delta t_{D,1}$, $\Delta t_{D,2}$), assigns, in each case, a continuous dwell time of the measured flow (d) less than the flow threshold ($d_s$) to a zero flow interval ($\Delta t_{N,1}$), determines, in each case, a deviation volume of the flow volume ($V_1$, $V_2$) in one of the flow intervals ($\Delta t_{D,1}$, $\Delta t_{D,2}$) from the reference flow volume and compares the deviation volume to the threshold deviation volume, and, if the deviation volume in one of the flow intervals ($\Delta t_{D,1}$, $\Delta t_{D,2}$) is less than the threshold deviation volume, determines and compensates the zero flow through the measuring tube (2) using the measured flow (d) in the zero flow interval ($\Delta t_{N,1}$) directly preceding the flow interval ($\Delta t_{D,1}$, $\Delta t_{D,2}$).

BRIEF DESCRIPTION OF THE DRAWINGS

The drawings show:
FIG. 3 is the flow chart of an embodiment of the method according to the invention.

DETAILED DESCRIPTION OF THE INVENTION

Figure 1:
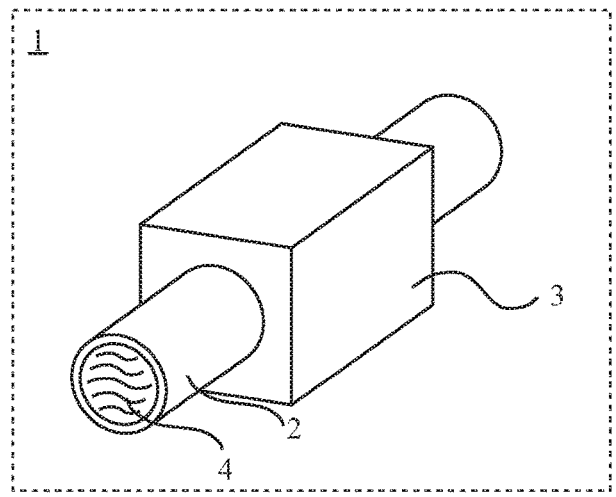
FIG. 1 is an embodiment of the flowmeter according to the invention.
Figure 2:
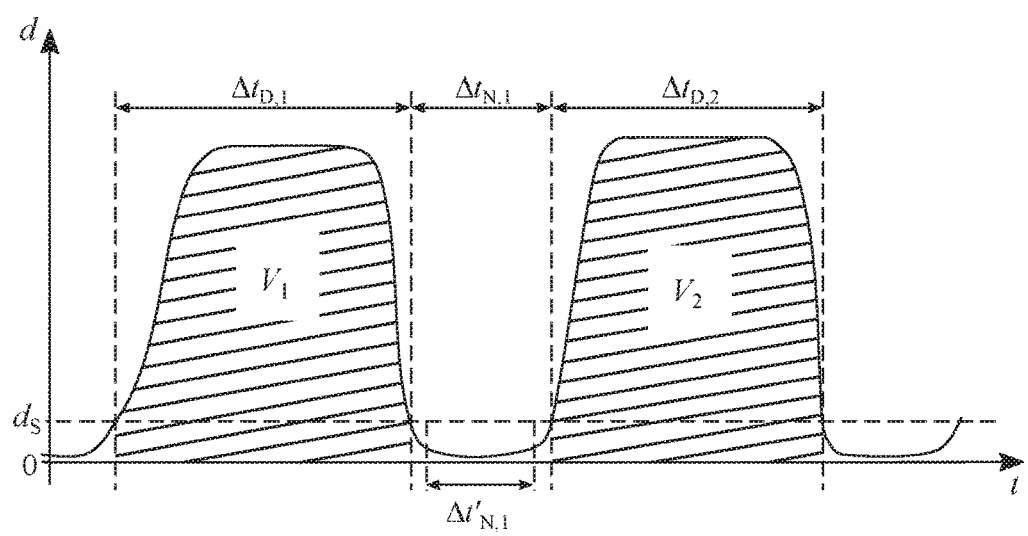
FIG. 2 is a flow measured by the flowmeter.

The embodiment schematically shown in FIG. 1 of the flowmeter 1 according to the invention is a magnetic-inductive flowmeter. It has a measuring tube 2 and a controller 3 and is integrated in a filling process of a medium 4. The filling process consists essentially of a first and a second filling step, which are continually repeated. In the first filling step, the medium 4 is conveyed, whereby is also flows through the measuring tube 2. In the second filling step, the medium 4 is no longer conveyed, whereby it is stagnant 2 in the measuring tube. Since the flowmeter 1 is in operation, the controller 3 measures the flow d over the time t shown in FIG. 2 and carries out the method according to the invention as shown in the flow chart in FIG. 3.

The method according to the invention comprises the following method steps:

In a first method step 5, a first and a second continuous dwell time of the measured flow d greater than or equal to a flow threshold $d_s$ are assigned to a first flow interval $\Delta t_{D,1}$ and a second flow interval $\Delta t_{D,2}$. The first flow interval $\Delta t_{D,1}$ and the second flow interval $\Delta t_{D,2}$ each correspond to a first filling step. Further, using integration, a first flow volume $V_1$, is determined from the measured flow d in the entire first flow interval $\Delta t_{D,1}$, and a second volume $V_2$ is determined from the measured flow d in the entire second flow interval $t_{D,2}$.

Then, in a second method step 6, the deviation volume of the flow volume $V_2$ in the second flow interval $t_{D,2}$ is determined by subtraction from a reference flow volume and the deviation volume is compared to a threshold deviation volume. Thereby, the reference flow volume is determined from the first flow volume $V_1$, in that the first flow volume $V_1$ is assigned to the reference flow volume.

Then, in a third method step 7, a continuous dwell time of the measured flow d less than the flow threshold $d_s$ is assigned to a zero flow interval $\Delta t_{N,1}$, since the deviation volume in the second flow interval $t_{D,2}$ is less than the threshold deviation volume. The zero flow interval $\Delta t_{N,1}$ corresponds to a second filling step. Although the medium 4 in the measuring tube 2 is stagnant, the flow d measured by the flowmeter 1 is greater than zero. Consequently, the zero flow is greater than zero, whereby the measured flow d of the flowing medium 4 is afflicted by a constant measurement error in the amount of the zero flow.

Then, in a fourth method step 8, the zero flow through the measuring tube 2 is determined and compensated using the measured flow d in the first zero flow interval $\Delta t_{N,1}$ directly preceding the second flow interval $\Delta t_{D,2}$ since the deviation volume in the second flow interval $\Delta t_{D,2}$ is less than the threshold deviation volume. The compensation of the zero flow is carried out by subtraction of the zero flow from the measured flow d, whereby the constant measurement error caused by the zero flow is at least reduced. The measured flow d in a sub-interval $\Delta t'_{N,1}$ of the first zero flow interval $\Delta t_{N,1}$ is used thereby. The duration of the sub-interval $\Delta t'_{N,1}$ in the zero flow interval $\Delta t_{N,1}$ is dimensioned so that the asymptotic transient responses of the flow d within the sub-interval have already sufficiently subsided.

REFERENCE NUMBERS

1 Flowmeter
2 Measuring tube
3 Controller
4 Medium
5 First method step
6 Second method step
7 Third method step
8 Fourth method step
d Flow
$d_s$ Flow threshold
t Time
$\Delta t_{D,1}$ First flow interval
$\Delta t_{D,2}$ Second flow interval
$\Delta t_{N,1}$ Zero flow interval
$\Delta t'_{N,1}$ Sub-interval
$V_1$ First flow volume
$V_2$ Second flow volume

What is claimed is:
1. A method for operating a flowmeter having a measuring tube,
wherein the flow (d) of a medium through the measuring tube is measured,
wherein
in a first flow interval ($\Delta t_{D,1}$), a first continuous dwell time of the measured flow (d) greater than or equal to a flow threshold ($d_s$) is assigned to the first flow interval ($\Delta t_{D,1}$) and a first flow volume ($V_1$) is determined from the measured flow (d) in the first flow interval ($\Delta t_{D,1}$),
in a zero flow interval ($\Delta t_{N,1}$), a continuous dwell time of the measured flow (d) less than the flow threshold ($d_s$) is assigned to the zero flow interval ($\Delta t_{N,1}$),
in a second flow interval ($\Delta t_{D,2}$), a second continuous dwell time of the measured flow (d) greater than or equal to a flow threshold ($d_s$) is assigned to the second flow interval ($\Delta t_{D,2}$) and a second flow volume ($V_2$) is determined from the measured flow (d) in the second flow interval ($\Delta t_{D,2}$), a first deviation volume of the first flow volume ($V_1$) in the first flow interval ($\Delta t_{D,1}$) and a second deviation volume of the second flow volume ($V_2$) in the second flow interval ($\Delta t_{D,2}$), from a reference flow volume are determined and the first deviation volume and the second deviation volume are compared to a threshold deviation volume, when the first deviation volume is less than the threshold deviation volume, a zero flow through the measuring tube is determined and compensated using the measured flow (d) in the zero flow interval ($\Delta t_{N,1}$) directly preceding the first flow interval ($\Delta t_{D,1}$), and when the second deviation volume is less than the threshold deviation volume, a zero flow through the measuring tube is determined and compensated using the measured flow (d) in the zero flow interval ($\Delta t_{N,1}$) directly preceding the second flow interval ($\Delta t_{D,2}$).

2. The method according to claim 1, wherein the reference flow volume is determined from at least one of the first flow volumes ($V_1$) or the second flow volume ($V_2$).

3. The method according to claim 2, wherein the reference flow volume is determined in that one of the first flow volumes ($V_1$) or the second flow volume ($V_2$) is assigned to the reference flow volume.

4. The method according to claim 2, wherein the reference flow volume is determined in that an average value of at least two of the flow volumes is determined and assigned to the reference flow volume.

5. The method according to claim 1, wherein the first flow volume ($V_1$) is determined in a first sub-interval of the first flow interval ($\Delta t_{D,1}$), and the second flow volume ($V_2$) is determined in a second sub-interval of the second flow interval ($\Delta t_{D,2}$).

6. The method according to claim 1, wherein the measured flow (d), in each case, is used in a sub-interval ($\Delta t'_{N,1}$) of a zero flow interval ($\Delta t_{N,1}$).

7. The method according to claim 1, wherein, when the first deviation volume is less than the threshold deviation volume, a continuous dwell time of the measured volume (d) less than the flow threshold ($d_s$) is assigned to the zero flow interval ($\Delta t_{N,1}$), wherein the zero flow interval ($\Delta t_{N,1}$) directly precedes the first flow interval ($\Delta t_{D,1}$), and when the second deviation volume is less than the threshold deviation volume, a continuous dwell time of the measured volume (d) less than the flow threshold ($d_s$) is assigned to the zero flow interval ($\Delta t_{N,1}$), wherein the zero flow interval ($\Delta t_{N,1}$) directly precedes the second flow interval ($\Delta t_{D,2}$).

8. The method according to claim 1, wherein the zero flow is determined using the measured flow (d) of at least two zero flow intervals ($\Delta t_{N,1}$), in that a moving average is formed from the measured flow (d) in the at least two zero flow intervals ($\Delta t_{N,1}$) or in that a median filter is used on the measured flow (d) in the at least two zero flow intervals ($\Delta t_{N,1}$).

9. A flowmeter having a measuring tube and a controller, wherein the controller measures the flow (d) of a medium through the measuring tube during operation, wherein, during operation, the controller
stores a flow threshold ($d_s$), a reference flow volume and a threshold deviation volume,
assigns, in a first flow interval ($\Delta t_{D,1}$), a first continuous dwell time of the measured flow (d) greater or equal to the flow threshold ($d_s$) to the first flow interval ($\Delta t_{D,1}$) and determines a first flow volume ($V_2$) from the measured flow (d) in the first flow interval ($\Delta t_{D,2}$),
assigns a continuous dwell time of the measured flow (d) less than the flow threshold ($d_s$) to the zero flow interval ($\Delta t_{N,1}$),
assigns, in a second flow interval ($\Delta t_{D,2}$), a second continuous dwell time of the measured flow (d) greater or equal to the flow threshold ($d_s$) to the second flow interval ($\Delta t_{D,2}$) and determines a second flow volume ($V_2$) from the measured flow (d) in the second flow interval ($\Delta t_{D,2}$),
determines a first deviation volume of the first flow volume ($V_1$) in the first flow intervals ($\Delta t_{D,1}$) and a second deviation volume of the second flow volume ($V_2$) in the second flow interval ($\Delta t_{D,2}$), from the reference flow volume and compares the first deviation volume and the second deviation volume to the threshold deviation volume,
when the first deviation volume is less than the threshold deviation volume, determines and compensates the zero flow through the measuring tube using the measured flow (d) in the zero flow interval ($\Delta t_{N,1}$) directly preceding the first flow interval ($\Delta t_{D,1}$), and
when the second deviation volume is less than the threshold deviation volume, determines and compensates the zero flow through the measuring tube using the measured flow (d) in the zero flow interval ($\Delta t_{N,1}$) directly preceding the second flow interval ($\Delta t_{D,2}$).

10. A method of operating a flowmeter, the flowmeter comprising a measuring tube and a controller, the method comprising:
using the measuring tube and the controller, measuring a first measured flow and a first continuous dwell time of the first measured flow during a first flow interval when the first measured flow is greater than or equal to a flow threshold;
by the controller, determining a first flow volume based on the first measured flow and the first continuous dwell time;
using the measuring tube and the controller, measuring a measured zero flow and a zero flow continuous dwell time of the measured zero flow during a zero flow interval when the measured zero flow is less than the flow threshold;
using the measuring tube and the controller, measuring a second measured flow and a second continuous dwell time of the second measured flow during a second flow interval when the second measured flow is greater than or equal to the flow threshold;
by the controller, determining a second flow volume based on the second measured flow and the second continuous dwell time;
by the controller, determining a deviation volume of the second flow volume based on a reference flow volume, and comparing the deviation volume to a threshold deviation volume;
when the deviation volume is less than the threshold deviation volume, compensating, by the controller, the second measured flow based on the measured zero flow, wherein the zero flow interval directly precedes the second flow interval.

11. The method according to claim 10, wherein the reference flow volume is the first flow volume.

12. The method according to claim 10, wherein the reference flow volume is an average of a plurality of preceding flow volumes determined by the controller.

13. The method according to claim 10, wherein determining the deviation volume comprises subtracting the second flow volume from the reference flow volume.

14. The method according to claim 10, wherein compensating the second measured flow based on the measured zero flow comprises subtracting the measured zero flow from the second measured flow.

15. The method according to claim 10, wherein compensating the second measured flow based on the measured zero flow comprises:

by the controller, determining within the zero flow interval a zero flow sub-interval excluding asymptotic transient responses of the measured zero flow;

by the controller, determining the measured zero flow within the zero flow sub-interval; and by the controller, compensating the second measured flow based on the measured zero flow within the zero flow sub-interval.

16. A flowmeter comprising:

a measuring tube; and a controller, wherein the controller is configured:

to use the measuring tube to measure a first measured flow and a first continuous dwell time of the first measured flow during a first flow interval when the first measured flow is greater than or equal to a flow threshold;

to determine a first flow volume based on the first measured flow and the first continuous dwell time;

to use the measuring tube to measure a measured zero flow and a zero flow continuous dwell time of the measured zero flow during a zero flow interval when the measured zero flow is less than the flow threshold;

to use the measuring tube to measure a second measured flow and a second continuous dwell time of the second measured flow during a second flow interval when the second measured flow is greater than or equal to the flow threshold;

to determine a second flow volume based on the second measured flow and the second continuous dwell time;

to determine a deviation volume of the second flow volume based on a reference flow volume, and comparing the deviation volume to a threshold deviation volume;

when the deviation volume is less than the threshold deviation volume, to compensate, the second measured flow based on the measured zero flow, wherein the zero flow interval directly precedes the second flow interval.

17. The flowmeter according to claim 16, wherein the reference flow volume is the first flow volume.

18. The flowmeter according to claim 16, wherein the controller determines the deviation volume by subtracting the second flow volume from the reference flow volume.

19. The flowmeter according to claim 16, wherein the controller compensates the second measured flow based on the measured zero flow by subtracting the measured zero flow from the second measured flow.

20. The flowmeter according to claim 16, wherein the controller compensates the second measured flow based on the measured zero flow by:

determining within the zero flow interval a zero flow sub-interval excluding asymptotic transient responses of the measured zero flow;

determining the measured zero flow within the zero flow sub-interval; and compensating the second measured flow based on the measured zero flow within the zero flow sub-interval.

* * * * *